United States Patent
Ozkasap

(10) Patent No.: US 12,420,929 B2
(45) Date of Patent: Sep. 23, 2025

(54) FIXING APPARATUS

(71) Applicant: TUSAS—TURK HAVACILIK VE UZAY SANAYII ANONIM SIRKETI, Kahramankazan/Ankara (TR)

(72) Inventor: Kemal Baris Ozkasap, Kahramankazan/Ankara (TR)

(73) Assignee: TUSAS—TURK HAVACILIK VE UZAY SANAYII ANONIM SIRKETI, Kahramankazan/Ankara (TR)

( * ) Notice: Subject to any disclaimer, the term of this patent is extended or adjusted under 35 U.S.C. 154(b) by 0 days.

(21) Appl. No.: 18/703,603

(22) PCT Filed: Oct. 18, 2022

(86) PCT No.: PCT/TR2022/051153
§ 371 (c)(1),
(2) Date: Apr. 22, 2024

(87) PCT Pub. No.: WO2023/075731
PCT Pub. Date: May 4, 2023

(65) Prior Publication Data
US 2025/0236394 A1    Jul. 24, 2025

(30) Foreign Application Priority Data
Oct. 27, 2021   (TR) .............................. 2021/016790

(51) Int. Cl.
*B64D 11/06*   (2006.01)

(52) U.S. Cl.
CPC .............................. *B64D 11/0602* (2014.12)

(58) Field of Classification Search
CPC .................................................... B64D 11/0602
USPC ..................................................... 248/200, 27.1
See application file for complete search history.

(56) References Cited

U.S. PATENT DOCUMENTS

| | | | | |
|---|---|---|---|---|
| 4,858,067 A * | 8/1989 | Rochelle | .................. | H02B 1/40 361/600 |
| 5,211,459 A * | 5/1993 | Wu | .................. | G06F 1/184 |
| 5,560,572 A * | 10/1996 | Osborn | .................. | G12B 9/00 248/27.3 |
| 7,008,233 B1 | 3/2006 | Ruff | | |
| 7,506,843 B2 * | 3/2009 | McKelvey | .................. | B60R 11/02 248/609 |
| 7,658,357 B2 | 2/2010 | Babian | | |
| 8,276,849 B2 | 10/2012 | Bopp | | |

(Continued)

OTHER PUBLICATIONS

International Search Report and Written Opinion for PCT application No. PCT/TR2022/051153, mailed Jan. 20, 2023.

*Primary Examiner* — Anita M King
(74) *Attorney, Agent, or Firm* — Notaro, Michalos & Zaccaria P.C.

(57) ABSTRACT

A first structural part is located in a body located at an air vehicle. The first structural part carries loads on the body. A second structural part is located opposite the first structural part. Two lightening holes in the form of a circular opening on the first structural part are opposite to two lightening holes in the form of a circular opening on the second structural part. An equipment provides various functions on the air vehicle. At least one bracket enables the equipment to be connected to the first structural part and the second structural part.

15 Claims, 2 Drawing Sheets

(56) References Cited

U.S. PATENT DOCUMENTS

2001/0042812 A1* 11/2001 Perzewski ........... B60R 11/0252
  248/27.1
2006/0060732 A1   3/2006 Tannas, Jr.
2011/0176267 A1   7/2011 Polizzotto

* cited by examiner

FIXING APPARATUS

FIELD

This invention relates to a fixing apparatus used for the placement of equipment in air vehicles.

BACKGROUND

In air vehicles, avionics equipment is used to perform functions such as communication systems, navigation, mission control panels, indicators and sensors. Various provisioning brackets are available to mount the equipment to the structural parts of the air vehicle body. In some cases, it is necessary to secure equipment with brackets between holes provided in the air vehicle body, which are fatigue-critical areas. Since the equipment and the place where the bracket is connected to the structural part are at the same level, equipment removal/assembly processes are complicated and a connector joint area that must be left behind the equipment is reduced. It also makes it difficult for the pilot and/or passengers to access the equipment. It is not preferred to install equipment in fatigue-critical areas that, such as between two holes in the body, compared to other areas. Therefore, brackets are designed to keep the equipment at a desired level while avoiding fatigue-critical areas.

US patent document U.S. Pat. No. 7,658,357, which is included in the known-state of the art, discloses a bracket for attaching a car console to a base of the vehicle. It comprises a one-piece mounting bracket, and a sidewall extending upwards from the base, from which the sidewall extends as a flange in the horizontal direction and vertical direction.

US patent document U.S. Pat. No. 8,276,849, which is included in the known-state of the art, discloses a bracket located to hold a pressure transducer. It discloses the bracket to which the pressure transformer is attached, which has an angle of less than 180 degrees between its front and rear parts. The bracket has a plate opening through which a cable can pass. Thanks to the angled structure of the bracket, the cables can pass through the openings at an angle.

SUMMARY

Thanks to a fixing apparatus according to the present invention, the bracket design that connects to the structural part and the equipment creates a level difference between the structural part and the equipment, making it easier to access the equipment.

Another object of the present invention is to provide the desired positioning of the equipment, which is connected to the points farther from the fatigue-critical regions, thanks to the fixing apparatus.

A further object of the present invention is to provide a fixing apparatus comprising a simple, easy-to-use and effective bracket manufactured in one piece, at a lower cost.

Yet another object of the present invention is to prevent loss of labor by facilitating equipment disassembly/assembly operations.

The fixing apparatus realized to achieve the object of the invention, which is illustrated in the first claim and other claims dependent thereon, comprises a body provided at air vehicles; a first structural part located in the body, carrying the loads on the body; a second structural part located opposite the first structural part; two lightening holes forming a circular opening on the first structural part; two other lightening holes located on the second structural part opposite to the two lightening holes on the first structural part; a device on the fuselage, which is necessary for the air vehicle; at least one equipment that is either an assembly or a system; at least one bracket that enables the equipment to be attached at one end to the first structural part and at the other end to the second structural part. The lightening holes are located such that the centers thereof remain opposite each other. Equipment can be mounted on structural parts such as frames, stringers, longerons, bulkheads in air vehicles, such that they remain between the lightening holes.

The fixing apparatus of the invention comprises a direction passing through the center of the lightening holes on the first structural part; a first bracket extending in a curved form at one end between the direction and the first structural part edge, and at the other end towards the inside of the body, close to the direction; a second bracket located mirror-symmetric with respect to the center between the first structural part and the second structural part. One end of the equipment is connected to the first bracket and the other end to the second bracket. A portion of the first bracket that is connected to the first structural part is located almost perpendicular to the first structural part edge, and a portion of the first bracket that extends into the body is curved relative to the first structural part edge. Therefore, the first bracket is mounted to the first structural part between two lightening holes and below two lightening holes, from a point further away from the two lightening holes. In this way, strength of the first structural part is increased. At the same time, there is a level difference between the portion of the bracket that connects to the first structural part and the equipment, making access to the equipment easier. Connector connections on the back of the equipment can be more easily disassembled and installed. The lightening holes and direction in the first structural part are also provided conjugately in the second structural part.

In an embodiment of the invention, the fixing apparatus comprises a first portion which is connected to the equipment and formed by the manufacturer bending the first bracket flat; a second portion which is connected to the first structural part and formed by the manufacturer bending the first bracket flat; a third portion located between the first portion and the second portion, extending from the first portion to the second portion, thus creating a level difference between the first portion and the second portion. Thanks to the first bracket comprising the third portion; the second portion, which is connected to a more distant point between the two lightening holes, ensures that the equipment is positioned at a place predetermined by the user. The first portion, the second portion and the third portion in the first bracket are located in the second bracket in a mirror symmetrical manner to the center of the equipment. The bracket design, which is cut by a method such as laser cutting, is then bent flat so that one end of the first bracket and the second bracket is inclined relative to the other end.

In an embodiment of the invention, the fixing apparatus comprises at least one support element, with one end connected to the first portion and the other end to the second portion and extending between the first portion and the second portion, wherein the support element has a curved form corresponding to the third portion. Thus, strength of the bracket increases and the equipment is mounted to the bracket more firmly. The support member is mounted on both the first bracket and the second bracket.

In an embodiment of the invention, the fixing apparatus comprises the support element forming an almost triangular opening in the first bracket. It comprises the support element which also creates an almost triangular opening in the second bracket. Said opening is formed when the support element is attached to the first bracket and the second bracket.

In an embodiment of the invention, the fixing apparatus comprises an attachment which is connected at one end to the first bracket, and at the other end to the second bracket.

Therefore, it is ensured that the equipment is mounted more securely to the first bracket and the second bracket.

In an embodiment of the invention, the fixing apparatus comprises the second portion connected to the first structural part at a point further away from the point between the lightening holes, approximately perpendicular to the edge of the first structural part and equidistant from the lightening holes. Strength of the first structural part increases thanks to the second portion connected at a point distant from a point between the two fatigue-critical lightening holes. Said second portion is also provided in the second bracket attached to the second structural part.

In an embodiment of the invention, the fixing apparatus comprises that the attachment is almost above the direction, and the second portion is almost below the direction relative to the attachment. The second portion is located at the first bracket mounted on the first structural part and at the second bracket mounted on the second structural part. In this way, a level difference is created between the equipment and the second portion.

In an embodiment of the invention, the fixing apparatus comprises the bracket produced by adjusting a size of the first portion, second portion and third portion depending on the equipment size. Therefore, the first portion, the second portion and the third portion are formed by bending the bracket accordingly.

In an embodiment of the invention, the fixing apparatus comprises a successive continuation of the lightening holes on the first structural part, following each other. The lightening holes on the second structural part are also located in the same way.

In an embodiment of the invention, the fixing apparatus comprises the second bracket, which is conjugate with the first bracket and has the same characteristics.

In an embodiment of the invention, the fixing apparatus comprises first bracket and second bracket, which are sheet metal or sheet plate. Therefore, the bracket produced in a less costly way can be bent and given a desired shape.

In an embodiment of the invention, the fixing apparatus comprises the first bracket and the second bracket, which are produced by methods such as bending and pulling in NC, CNC machines.

In an embodiment of the invention, the fixing apparatus comprises the first portion mounted on equipment with a dzus rail. In this way, disassembly/assembly operations of the first portion to the equipment are easy.

In an embodiment of the invention, the fixing apparatus comprises the third portion, which has a parallelogram form. Thanks to its form, one end of the bracket can create a level difference with respect to the other end.

In an embodiment of the invention, the fixing apparatus comprises the bracket in helicopters, which is positioned on a passenger seat for easy passenger access to equipment.

BRIEF DESCRIPTION OF THE DRAWINGS

The fixing apparatus realized to achieve the object of the present invention is illustrated in the attached drawings, in which.

DETAILED DESCRIPTION

Figure 1:
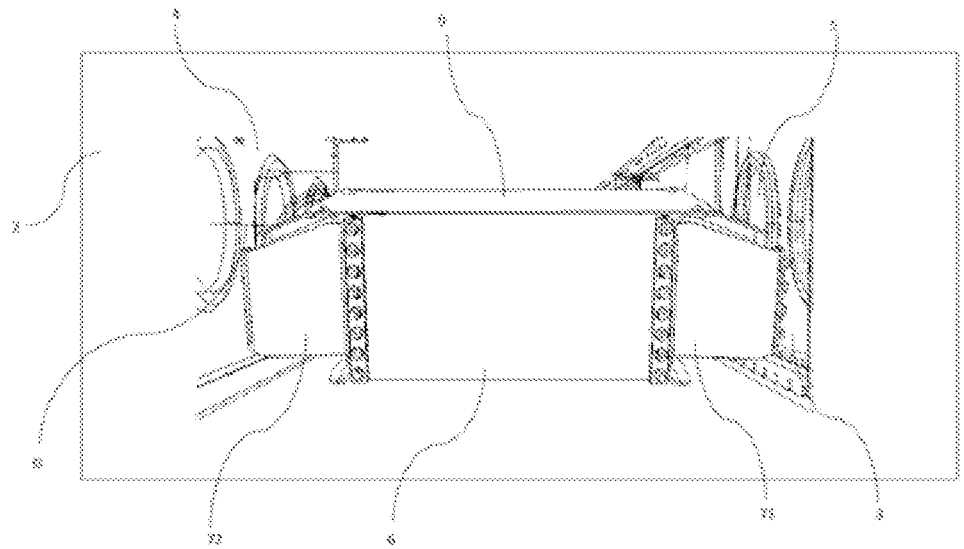
FIG. 1 is a schematic illustration of the fixing apparatus.

All the parts illustrated in figures are individually assigned a reference numeral and the corresponding terms of these numbers are listed below:
1. Fixing Apparatus
2. Body
3. First Structural Part
4. Second Structural Part
5. Lightening Hole
6. Equipment
7. Bracket
    71. First Bracket
    72. Second Bracket
    711. First Portion
    721. Second Portion
    731. Third Portion
8. Support Element
9. Attachment
    (D) Direction The fixing apparatus (1) comprises a body (2) located at an air vehicle; a first structural part (3) located in the body (2) and carrying the loads on the body (2); a second structural part (4) located opposite the first structural part (3); two lightening holes (5) in the form of a circular opening on the first structural part (3); other two lightening holes (5) in the form of a circular opening on the second structural part (4), which are opposite to the two lightening holes (5) on the first structural part (3); at least one equipment (6) used to provide various functions on the air vehicle; at least one bracket (7) enabling the equipment (6) to be connected to the first structural part (3) and the second structural part (4).

The fixing apparatus (1) according to the invention comprises a direction (D) passing through the centers of the lightening holes (5) on the first structural part (3); a first bracket (71) mounted on the equipment (6) with one end extending between the direction (D) and an edge of the first structural part (3), the other end extending into the body (2) to approach the direction (D); a second bracket (72) mounted on the second structural part (4), which is opposite the first bracket (71) so as to be mirror-symmetrical with respect to the center between and almost in the middle of the first structural part (3) and the second structural part (4); the equipment (6) located between the first bracket (71) and the second bracket (72).

Figure 2:
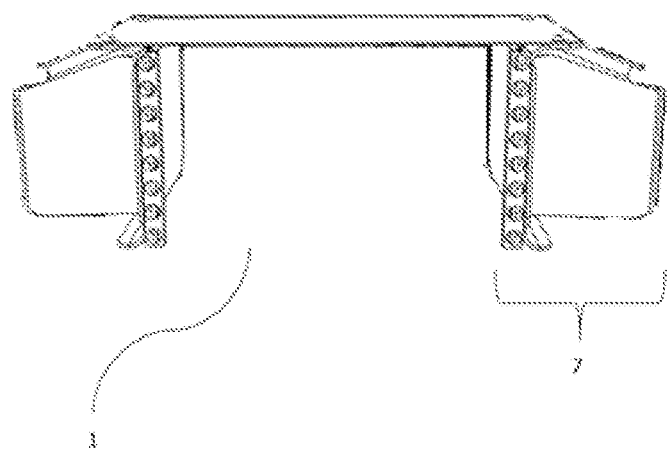
FIG. 2 is a schematic illustration of the fixing apparatus.
Figure 3:
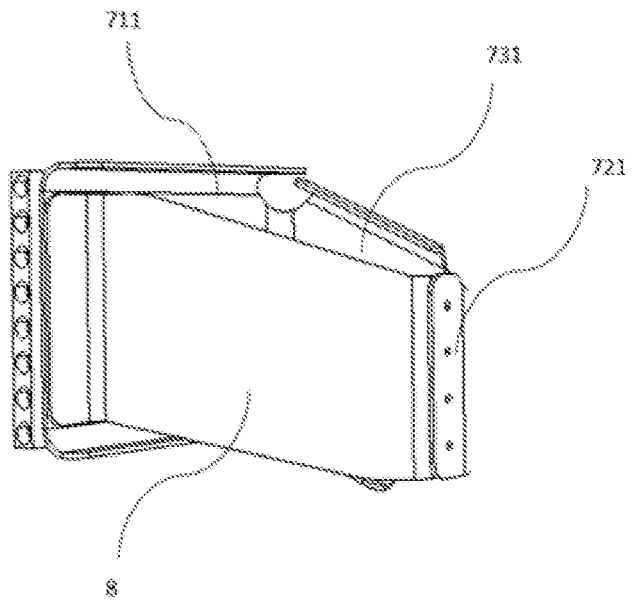
FIG. 3 is a schematic illustration of the first portion and the second portion.
Figure 4:
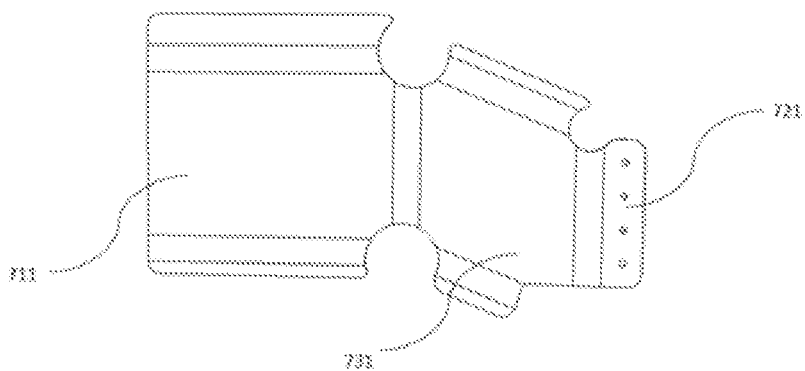
FIG. 4 is a schematic illustration of the first bracket and the second bracket before bending.

It comprises a body (2) located at air vehicles; a first structural part (3) located in the body (2) and carrying the loads on the body (2); a second structural part (4) located in the body (2) so as to be opposite the first structural part (3); two lightening holes (5) forming a circular opening, which are located sequentially on the first structural part (3) and the second structural part (4), opposite to each other; at least one equipment (6) used to provide various functions on the air vehicle; at least one bracket (7) enabling the equipment (6) to be connected at one end to the first structural part (3), and at another end to the second structural part (4). There are at least two lightening holes (5) in each of the first structural part (3) and the second structural part (4). There are lightening holes (5) both side by side and opposite each other (FIG. 1, FIG. 2).

It comprises a first bracket (71), with one end mounted between the edge of the first structural part (3) and the direction (D) passing through the centers of the lightening holes (5) on the first structural part (3), and with the other end mounted on the equipment (6) in a curved form towards the equipment (6); a second bracket (72) opposing the first bracket (71) and mounted on the second structural member (4) such that it is mirror symmetric with respect to the center of the equipment (6); the equipment (6) located between the first bracket (71) and the second bracket (72). It comprises the first bracket (71) and the second bracket (72), with one end between the centers of the lightening holes (5) and below the direction (D), and the other end connected to the equipment (6), thereby creating a level difference between the equipment (6) and the portion connected to the first structural part (3) and the second structural part (4). The equipment (6) is connected to the first bracket (71) at one end and to the second bracket (72) at the other end. It comprises the second bracket (72) which is mirror symmetric with respect to the center between and in the middle of the first structural part (3) and the second structural part (4). The second bracket (72) is mounted on the second structural part (4).

In an embodiment of the invention, the fixing apparatus (1) comprises a first portion (711) which is formed by the manufacturer previously bending the first bracket (71), and which connects the first bracket (71) to the equipment (6); a second portion (721) which is formed by the manufacturer previously bending the first bracket (71), and which connects the first bracket (71) to the first structural part (3); a third portion (731) extending to create a height difference between the first portion (711) and the second portion (721); the first bracket (71) that enables the equipment (6) to be positioned in a manner predetermined by the user. Thanks to the first portion (711), the second portion (721) and the third portion (731), which are bent in a monolithic manner pre-determined by the manufacturer, the equipment (6) can be brought to a position pre-desired by the user. In this way, access to the equipment (6) becomes easier.

In an embodiment of the invention, the fixing apparatus (1) comprises at least one support element (8) extending between the first portion (711) and the second portion (721) in a curved form, with one end connected to the first portion (711) and the other end to the second portion (721). The support element (8) is located between the first portion (711) and the second portion (721) so as to be form-compatible with the third portion (731).

In an embodiment of the invention, the fixing apparatus (1) comprises the support element (8) forming an almost triangular opening in the first bracket (71). It comprises the support element (8) forming an almost triangular opening in the second bracket (72).

In an embodiment of the invention, the fixing apparatus (1) comprises an attachment (9) connecting the first bracket (71) and the second bracket (72) to each other. The attachment (9) is connected to the first bracket (71) at one end and to the second bracket (72) at the other end. Thanks to the attachment (9) on the equipment (6), the equipment (6) can be mounted more robustly.

In an embodiment of the invention, the fixing apparatus (1) comprises the second portion (721) extending almost perpendicular to the edge of the first structural part (3) and connected to the first structural part (3) at an equal distance from the lightening holes (5). Similarly, it comprises the second portion (721) extending almost perpendicular to the edge of the second structural part (4) and connected to the second structural part (4) at an equal distance from the lightening holes (5).

In an embodiment of the invention, the fixing apparatus (1) comprises the attachment (9) which is mounted on the equipment to be above the direction (D); the second portion (721) mounted on the first structural part (3) or the second structural part (4) so as to be below the direction (D) with respect to the attachment (9). It comprises the bracket (7) extending between the first structural part (3) and the second structural part (4) so that the attachment (9) is just above the direction (D) and the second portion (721) is just below the direction (D). Therefore, a height difference is created between the equipment (6) and the second portion (721).

In an embodiment of the invention, the fixing apparatus (1) comprises the bracket (7) produced by the user predetermining the sizes of the first portion (711), the second portion (721) and the third portion (731) according to the size of the equipment (6).

In an embodiment of the invention, the fixing apparatus (1) comprises the lightening holes (5) located sequentially along the first structural part (3). It comprises the lightening hole (5), which is located sequentially along the direction in which the first structural part (3) extends. It comprises the lightening hole (5), which is located sequentially along the direction in which the second structural part (4) extends.

In an embodiment of the invention, the fixing apparatus (1) comprises the second bracket (72) conjugated with the first bracket (71).

In an embodiment of the invention, the fixing apparatus (1) comprises the first bracket (71) and the second bracket (72), which are sheet metal or sheet plate. Therefore, the first bracket (71) and the second bracket (72) are produced with a lower cost.

In an embodiment of the invention, the fixing apparatus (1) comprises the first bracket (71) and the second bracket (72), which are produced by any of the bending and pulling methods in NC (numerical control), CNC (computer numerical control) machine tools.

In an embodiment of the invention, the fixing apparatus (1) comprises the first portion (711) mounted to the equipment (6) with a dzus rail. In this way, the equipment (6) can be removed and installed more easily.

In an embodiment of the invention, the fixing apparatus (1) comprises the third portion (731) which is in the form of a parallelogram.

In an embodiment of the invention, the fixing apparatus (1) comprises the bracket (7) provided in helicopters, which is located on a passenger seat such that passengers can access.

The invention claimed is:

1. A fixing apparatus (1) comprising:
   a body (2) located at an air vehicle;
   a first structural part (3) located in the body (2) and carrying loads on the body (2);
   a second structural part (4) located opposite the first structural part (3);
   two first lightening holes (5) in the form of a circular opening on the first structural part (3);
   two second lightening holes (5) in the form of a circular opening on the second structural part (4), which are opposite to the two first lightening holes (5) on the first structural part (3);
   at least one equipment (6) used to provide various functions on the air vehicle;
   at least one bracket (7) enabling the equipment (6) to be connected to the first structural part (3) and the second structural part (4),
   a first bracket (71) mounted on the equipment (6) with one end extending between direction (D) passing through the centers of the first lightening holes (5) on the first structural part (3) and an edge of the first structural part (3), the other end extending into the body (2) to approach the direction (D);

a second bracket (72) mounted on the second structural part (4), which is opposite the first bracket (71) so as to be mirror-symmetrical with respect to the center between and almost in the middle of the first structural part (3) and the second structural part (4); and the equipment (6) located between the first bracket (71) and the second bracket (72).

2. The fixing apparatus (1) according to claim 1, comprising:

a first portion (711) formed by the manufacturer previously bending the first bracket (71), and which connects the first bracket (71) to the equipment (6);

a second portion (721) which is formed by the manufacturer previously bending the first bracket (71), and which connects the first bracket (71) to the first structural part (3); and a third portion (731) extending to create a height difference between the first portion (711) and the second portion (721); the first bracket (71) that enables the equipment (6) to be positioned in a manner predetermined by the user.

3. The fixing apparatus (1) according to claim 2, comprising at least one support element (8) extending between the first portion (711) and the second portion (721) in a curved form, with one end connected to the first portion (711) and the other end to the second portion (721).

4. The fixing apparatus (1) according to claim 3, wherein the support element (8) forms an almost triangular opening in the first bracket (71).

5. The fixing apparatus (1) according to claim 1, comprising an attachment (9) connecting the first bracket (71) and the second bracket (72) to each other.

6. The fixing apparatus (1) according to claim 2, wherein the second portion (721) extends almost perpendicular to the edge of the first structural part (3) and connected to the first structural part (3) at an equal distance from the first lightening holes (5).

7. The fixing apparatus (1) according to claim 5, wherein the attachment (9) is mounted on the equipment to be above the direction (D); and a second portion (721) is mounted on the first structural part (3) or the second structural part (4) so as to be below the direction (D) with respect to the attachment (9).

8. The fixing apparatus (1) according to claim 2, wherein the bracket (7) is produced by the user predetermining the sizes of the first portion (711), the second portion (721) and the third portion (731) according to the size of the equipment (6).

9. The fixing apparatus (1) according to claim 1, wherein the first lightening holes (5) are located sequentially along the first structural part (3).

10. The fixing apparatus (1) according to claim 1, wherein the second bracket (72) is conjugated with the first bracket (71).

11. The fixing apparatus (1) according to claim 1, wherein the first bracket (71) and the second bracket (72) are sheet metal or sheet plate.

12. The fixing apparatus (1) according to claim 1, wherein the first bracket (71) and the second bracket (72) are produced by any of the bending and pulling methods in NC (numerical control), CNC (computer numerical control) machine tools.

13. The fixing apparatus (1) according to claim 1, wherein a first portion (711) is mounted to the equipment (6) with a dzus rail.

14. The fixing apparatus (1) according to claim 2, wherein the third portion (731) is in the form of a parallelogram.

15. The fixing apparatus (1) according to claim 2, wherein the bracket (7) is provided in helicopters and is located on a passenger seat such that passengers can access.

* * * * *